…

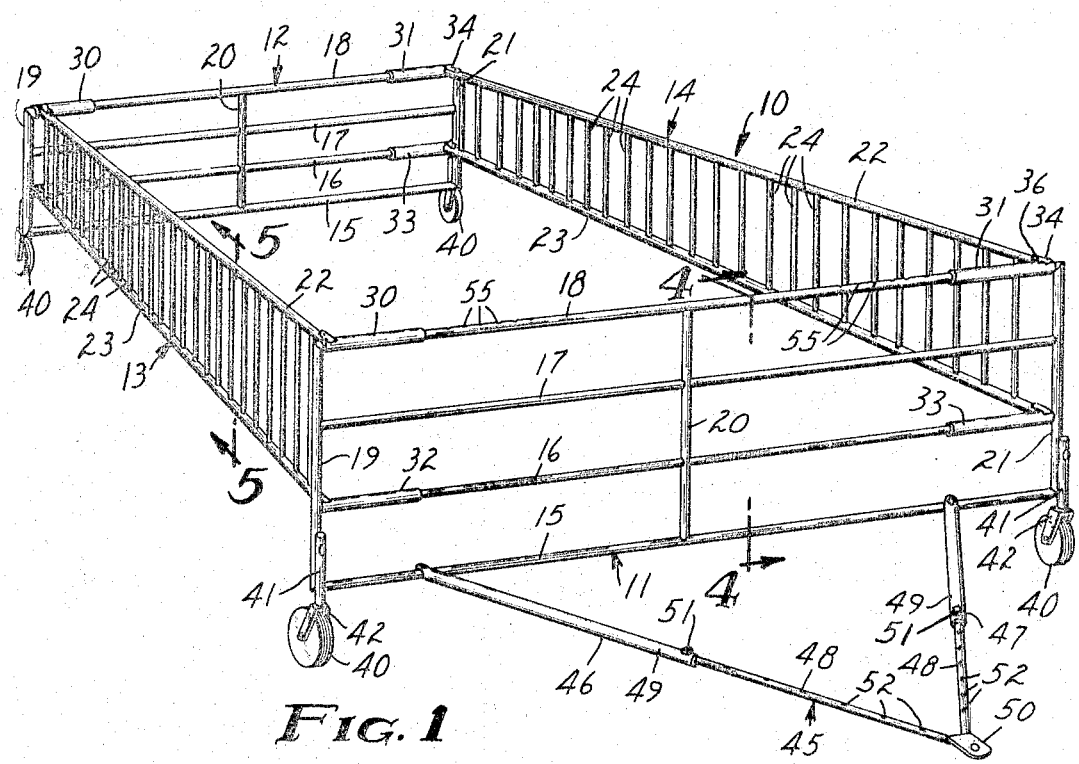
FIG. 1
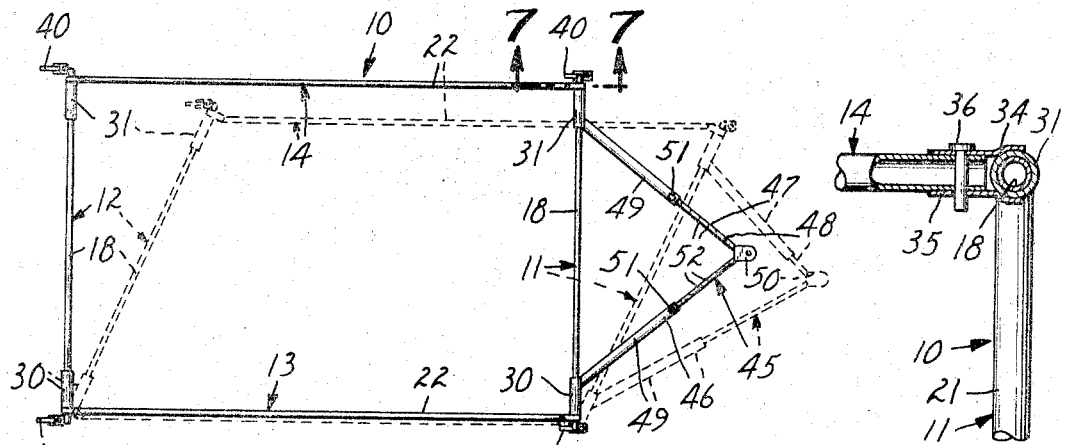
FIG. 2
FIG. 7
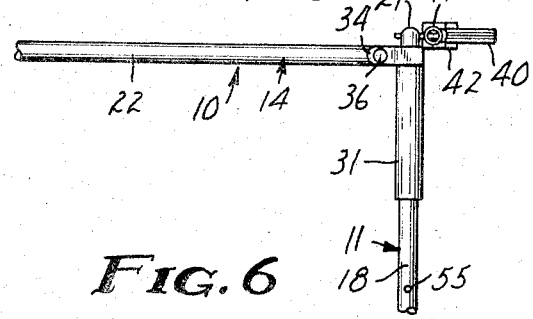
FIG. 6
INVENTOR.
JERALD J. SWANSON
BY Merchant & Gould
ATTORNEYS

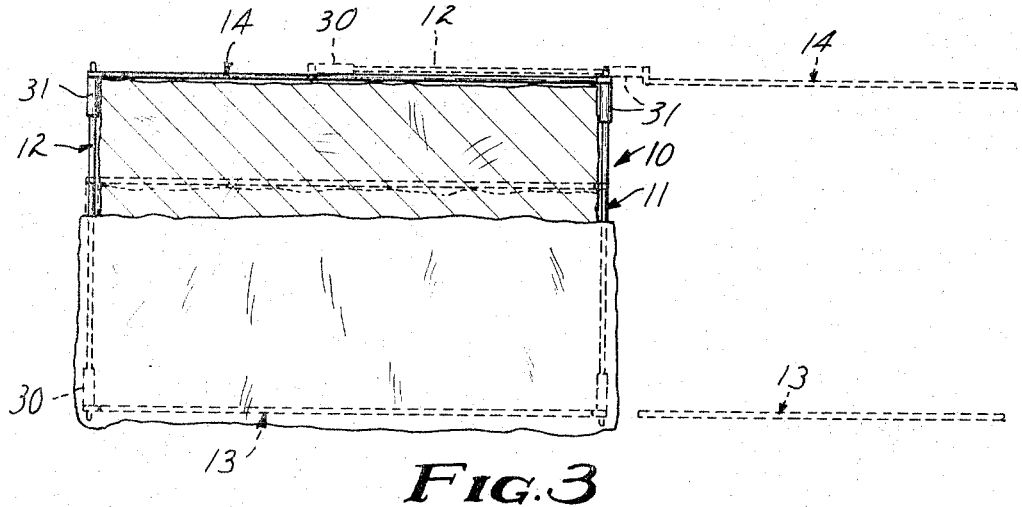
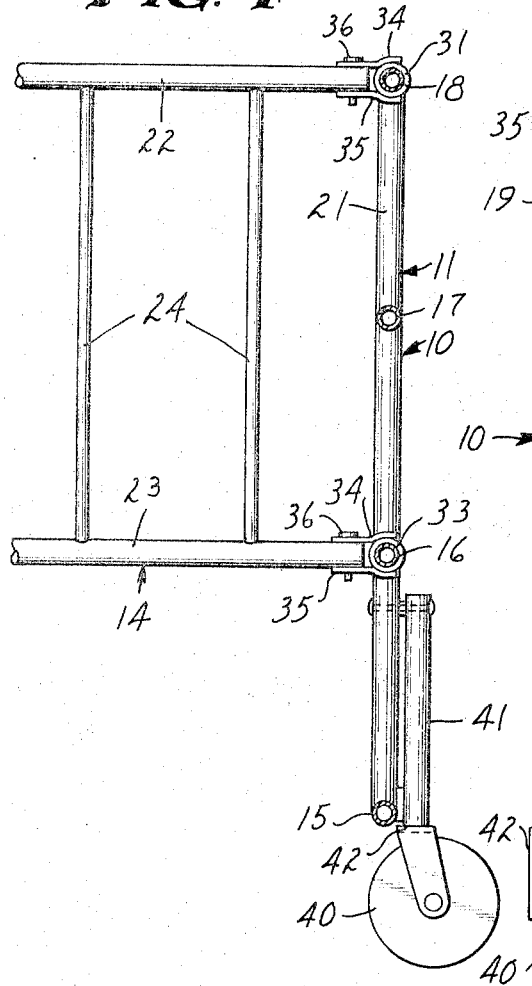
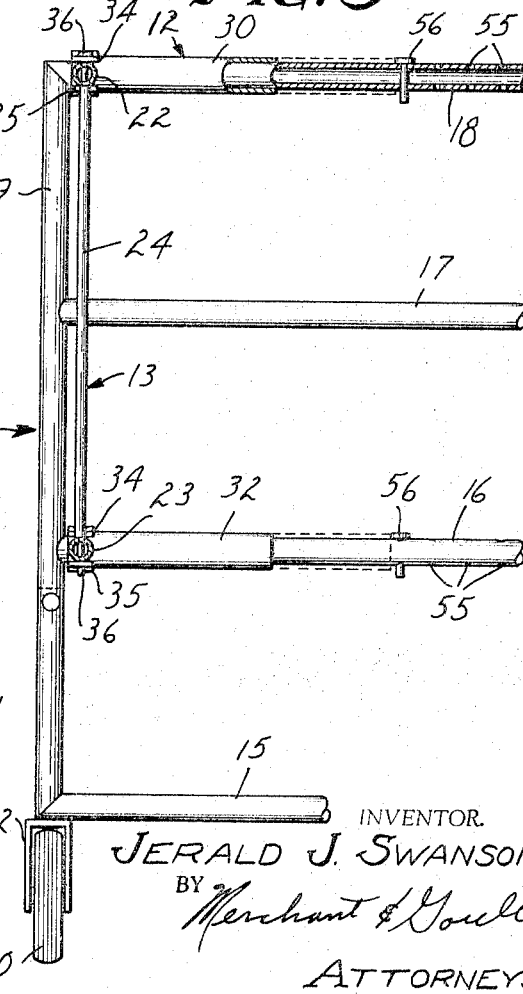

United States Patent Office 3,336,908
Patented Aug. 22, 1967

3,336,908
HAY STACK FORMER AND FEEDER
Jerald J. Swanson, Pukwana, S. Dak. 57370
Filed Apr. 27, 1966, Ser. No. 545,594
4 Claims. (Cl. 119—60)

ABSTRACT OF THE DISCLOSURE

A four-sided apparatus for forming and/or feeding hay stacks having two opposed sides which slide horizontally relative to the remaining two sides, and which are pivotally mounted adjacent the ends to the remaining two sides. A hollow cylindrical member is slidably mounted approximately coaxially over an elongated cylindrical portion positioned approximately horizontally in each of the remaining sides and a clevis-like member is fixedly attached to each of the hollow cylindrical members. The oppositely disposed movable sides are attached to the clevis-like member by removable pins so that the entire apparatus can be taken apart and stored by the removal of the pins. The apparatus is mounted on four caster-type wheels for movement over the ground in any direction, and has a telescoping hitch attached thereto which can be adjusted to pull the apparatus when the sides are positioned at an angle other than 90° to each other.

---

This invention pertains to a device to be utilized for forming stacks of hay and/or feeding said stacks to cattle and more specifically to a device having a portable, adjustable frame the sides of which easily move inwardly as cattle or the like eat the hay therein so that the entire stack is gradually fed to the animals without being unduly spread around and wasted.

Many different portable hay stacking frames are disclosed in the prior art all of which have relatively high fixedly attached sides. These frames maintain the hay in a stack form as it is placed therein after which some portion of the frame may be opened to remove the frame from around the stack. In many of these devices cattle and the like could eat some of the hay therein. However, within a short period of time the cattle would eat the hay to a point beyond their reach after which the remaining hay would be unattainable to them.

In the present device a frame is provided which may be easily moved to a desired position and utilized as a hay stacker by extending the sides of the frame to their maximum outward position and packing the hay therein. The device may also be utilized as a feeder preferably by removing the wheels therefrom and leaving the frame with a stack of hay therein in a place convenient for the cattle. The frame of the present device includes a plurality of bars spaced so that cattle may easily reach therebetween to eat the hay contained within the frame. Also, the height of the frame is such that the average size animal can eat the hay to a point somewhat above the uppermost edge thereof. The sides of the frame are pivotally, movably attached to the ends of the frame so that they may slide inwardly as the hay is eaten away from the inside thereof. By making the frame a height which allows the animals to eat hay above the uppermost portions the hay will not interfere with the inward movement of the frame sides. Each end of either side is pivoted so that one end of a side may be moved into the hay stack independent of the other end of that side. Also, the inward movement of the sides may be stopped at any desired point so that the cattle will be required to clean up the loose hay before moving the sides further inwardly.

It is an object of this invention to provide a new and improved hay stack former and feeder.

It is a further object of the present invention to provide a hay stack feeder which is at least in part automatic and greatly increases the accessibility of the hay to the animals.

It is a further object of the present invention to provide a hay stacker and feeder in which the waste is substantially minimized.

It is a further object of the present invention to provide a hay stacker and feeder which is easily transportable.

These and other objects of this invention will become apparent to those skilled in the art upon consideration of the accompanying specification, claims, and drawings.

Referring to the drawings, wherein like characters indicate like parts throughout the figures:

FIG. 1 is a view in perspective of the present device;

FIG. 2 is a view in top plan of the present device somewhat diminished in size;

FIG. 3 is a view in top plan of the present device illustrating the various uses thereof;

FIG. 4 is an enlarged sectional view as seen from the line 4—4 in FIG. 1;

FIG. 5 is an enlarged sectional view as seen from the line 5—5 in FIG. 1;

FIG. 6 is a detailed view in top plan of one of the corners of the present device, parts thereof removed; and FIG. 7 is an enlarged sectional view as seen from the line 7—7 in FIG. 2.

In the figures the numeral 10 generally designates a frame having front and rear ends 11 and 12, respectively, and left and right sides 13 and 14, respectively. The front and rear ends 11 and 12 of the frame 10 are substantially similar each being rectangular in shape and comprised of four equally spaced horizontal bars 15, 16, 17 and 18, numbered from the lower bar to the upper bar, fixedly positioned and equally spaced by three vertical bars 19, 20 and 21. Since the two end members 11 and 12 are substantially similar the same numbers will be utilized to refer to the same components therein. The left and right side members 13 and 14 are also substantially similar and each is composed of an upper and lower horizontal bar 22 and 23, respectively, separated by a plurality of equally spaced vertical bars 24. The vertical bars 24 are spaced apart a sufficient distance to allow cattle and the like to place their heads therebetween when feeding. In the present embodiment all of the bars 15–24 are constructed from various sized pipe. However, it should be understood that solid rods or any other convenient form of material might be utilized to construct the frame 10 and it would still come within the scope of this invention.

Either end of each of the side members 13 and 14 are connected to the end members 11 and 12 in the following manner. Elongated hollow cylinders 30 and 31 having inside diameters slightly larger than the outside diameters of the bar 18 of end member 11 are positioned thereover in coaxial sliding relationship. The cylinder 30 is placed over the bar 18 of end member 11 between the vertical bars 19 and 20 and the cylinder 31 is placed over the bar 18 of end member 11 between the vertical bars 20 and 21. Two elongated hollow cylinders 32 and 33 having inside diameters slightly larger than the outside diameter of the bar 16 of end member 11 are placed thereover in sliding coaxial relationship. The cylinder 32 is positioned coaxially over the bar 16 of end member 11 between the vertical bars 19 and 20 and the cylinder 33 is positioned coaxially over the bar 16 of end member 11 between the vertical bars 20 and 21. In a similar fashion cylinders 30–33 are positioned over bars 16 and 18 of the end member 12.

Each of the cylinders 30–33 slideably positioned over end members 11 and 12 have a pair of brackets 34 and 35 fixedly attached thereto in some manner such as welding or the like. The brackets 34 and 35 are attached to the cylinders 30–33 so as to extend outwardly generally perpendicular to the longitudinal axis of the particular cylinder 30–33 to which they are attached and in a spaced apart relationship. A detailed view of the cylinder 31 positioned on end member 11 and its associated brackets 34 and 35 is illustrated in FIG. 7. Each of the pairs of brackets 34 and 35 are spaced apart a sufficient distance to receive therebetween an end of one of the horizontal bars 22 or 23 of the side members 13 or 14.

With the end of the bar 22 or 23 positioned between the brackets 34 and 35 an opening is formed through the brackets 34 and 35 and the bar 22 or 23. A pin 36 is positioned in the opening to pivotally attach the bar 22 or 23 to one of the cylinders 30–33. In this fashion one end of the bar 22 in the side member 13 is attached to the cylinder 30 on the end member 11 and the corresponding end of the bar 23 in the side member 13 is attached to the cylinder 32 in the end member 11. The opposite ends of the bars 22 and 23 in the side member 13 are connected to cylinders 30 and 32, respectively, in the end member 12. In a similar fashion one end of the bar 22 in the side member 14 is attached to the cylinder 31 in the end member 11 and the corresponding end of the bar 23 in the side member 14 is attached to the cylinder 33 in the end member 11. Also, the opposite ends of the bars 22 and 23 in the side member 14 are attached to cylinders 31 and 33, respectively, in the end member 12.

Thus, the side members 13 and 14 are slideably and pivotally attached to the end members 11 and 12 so that either end can slide inwardly along the horizontal bars 16 and 18 in the end members 11 and 12 without requiring the opposite end to slide simultaneously. Either end of the side members 13 and 14 will slide inwardly until the inner ends of the cylinders 30–33 attached thereto strike the center vertical bars 20 in the end members 11 and 12. Thus, when the side members 13 and 14 are moved to their outermost position the frame 10 forms a rectangle, which may be filled with a stack of hay, and when the side members 13 and 14 are moved to their innermost position any hay remaining therebetween can easily be reached by the feeding animals.

To make the frame 10 portable a caster wheel 40 is removably attached to the lower end of each of the vertical bars 19 and 21 at either end of both of the end members 11 and 12. Referring to FIG. 4 the corner of the frame 10 in which the ends of the bars 22 and 23 in the side member 14 are attached to the front end member 11 is illustrated. An elongated hollow cylinder 41 is fixedly attached to the lower end of the vertical bar 21 in the front end member 11 by welding at the lower extremity thereof and placing a bolt or the like through the upper end of the cylinder 41 and the vertical bar 21. The lower end of the hollow cylinder 41 is adapted to receive the usual caster wheel insert 42 therein. The caster wheel insert 42 is engaged in the cylinder 41 for rotation about its longitudinal axis so that the caster wheel 40 is mounted for rotation about its own horizontal axis and for pivotal movement about the vertical axis of the insert 42.

In FIGS. 1 and 2 apparatus designated 45 for connecting a draft device, such as a tractor or the like, to the frame 10 is illustrated. The apparatus 45 consists of a first and second telescoping member 46 and 47, respectively. Both of the telescoping members 46 and 47 consist of a member 48 coaxially engaged within a hollow cylindrical member 49 and adapted to telescope therein. The outermost or free ends of the members 48 are pivotally attached together by a hitch 50 and the outermost or free ends of the cylinders 49 are spaced apart and pivotally attached to the horizontal bar 15 in the front end member 11 of the frame 10. A pin 51 is inserted in a hole in the outer end of each cylinder 49 and through a desired one of a plurality of spaced apart holes 52 in the members 48 to maintain the cylinders 49 in a desired relationship relative to members 48. Thus, as illustrated in FIG. 2 either of the telescoping members 46 or 47 is shortened or lengthened slightly to allow the frame 10 to be slightly collapsed so that it is narrower during transportation.

The present device may be utilized in a great variety of ways several of which are illustrated by the following examples. The frame 10 may be utilized as a hay stack former by transporting it to any desirable place and moving the side members 13 and 14 to their outermost positions. The hay is then formed into a stack utilizing the frame 10 as a guide after which the pins 36 at one of the rear corners may be removed and the rear end member 12 swung outwardly at 90° to its normal position. The frame 10 can then be pulled away from the stack of hay and used to form a new stack. In a similar fashion the rear end member 12 may be swung out and the frame 10 positioned to enclose a stack of hay, as illustrated in FIG. 3, so that the frame 10 may be utilized as a feeder. In this mode of operation the caster wheels 40 are generally removed, after positioning the stack of hay in the frame 10, so that the end members 11 and 12 rest firmly on the ground. The side members 13 and 14 are free to move inwardly as the feeding animals eat the hay from within the frame 10. The height of the frame 10 is such that the average feeding animal can reach thereabove and remove hay at a sufficient height to allow the side members 13 and 14 to be pushed inwardly. As the feeding animals eat the hay and move the side members 13 and 14 inwardly, it is sometimes advantageous to stop the movement of the side members 13 and 14 and allow the animals to clean up the hay on the ground. Toward this end holes 55 are provided in the horizontal bars 16 and 18 of each of the end members 11 and 12 so that pins 56, illustrated in FIG. 5, may be placed therein to prevent further inward movement of the side members 13 and 14. In this fashion very little hay is wasted when the present hay stack feeder is utilized. Also, at times it may be advantageous to move the side members 13 and 14 to their outermost positions and allow overhanging hay to fall down in frame 10 within the reach of feeding animals, after which the side members 13 and 14 may again be allowed to slide inwardly from the pressure of the feeding animals.

Thus, a hay stack former and feeder is disclosed which greatly simplifies the production of hay stacks as well as the feeding thereof. Also, the present hay stack feeder can greatly reduce the amount of waste hay as well as automatically provide at all times a sufficient amount of hay for the animals to eat. In addition to the above advantages the present hay stack former and feeder can be collapsed somewhat so that it is easily transported on highways and the like.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:
1. A hay stack former and feeder comprising:
 (a) a frame having at least two end members and two side members, having openings therethrough for receiving the heads of feeding animals, each of said end members and said side members having at least two elongated cylindrical portions adapted to normally lie approximately horizontal when the members are correctly positioned relative to each other;
 (b) apparatus releasably attaching either end of each of said side members to each of said end members in an upright orientation for relative horizontal movement and relative pivotal movement between each of said attached members including:
  (1) a plurality of hollow cylindrical members slidably mounted approximately coaxially over at least two of said elongated cylindrical portions of each of said end members for relative horizontal movement therealong, and (2) means including a plurality of pins releasably attaching each end of said side members to at least one hollow cylindrical member for sliding horizontal movements therewith, said pins connecting said side members to said hollow cylindrical members so that removal of said pins separates said hay stack former into four substantially flat end and side members.

2. A hay stack former and feeder substantially as set forth in claim 1 having in addition a caster wheel removably mounted under each end of the end members to provide for horizontal movement of said stack former and feeder over the ground in substantially any direction.

3. A hay stack former and feeder substantially as set forth in claim 1 having in addition a removably mounted, telescoping draft attaching means.

4. A hay stack former and feeder as set forth in claim 1 wherein the means including a plurality of pins also includes a plurality of clevis-like members one each fixedly attached to one of the hollow cylindrical members and adapted to receive a portion of a side member sandwiched therein with a pin pivotally and releasably holding said portion of said side member therein.

References Cited
UNITED STATES PATENTS

| | | | |
|---|---|---|---|
| 2,491,577 | 12/1949 | Olinger | 119—60 |
| 2,714,367 | 8/1955 | Arnold | 119—27 |
| 2,729,196 | 1/1956 | Breitenbach | 119—20 |
| 3,020,882 | 2/1962 | Browning | 119—82 |
| 3,057,359 | 10/1962 | Schonert | 130—20 |
| 3,135,267 | 6/1964 | Liebig | 130—20 |

SAMUEL KOREN, *Primary Examiner.*

H. R. CHAMBLEE, *Assistant Examiner.*